United States Patent
Sandberg

(10) Patent No.: US 8,011,063 B2
(45) Date of Patent: Sep. 6, 2011

(54) OVERLOAD CLUTCH FOR ROTATING AGITATION MEMBER IN CLEANING MACHINE

(75) Inventor: Hakan Sandberg, Mellerud (SE)

(73) Assignee: Nilfisk-Advance A/S, Broendby (DK)

( * ) Notice: Subject to any disclaimer, the term of this patent is extended or adjusted under 35 U.S.C. 154(b) by 1166 days.

(21) Appl. No.: 11/671,197

(22) Filed: Feb. 5, 2007

(65) Prior Publication Data
US 2008/0185252 A1 Aug. 7, 2008

(51) Int. Cl.
*A47L 5/10* (2006.01)

(52) U.S. Cl. .......................................................... 15/390

(58) Field of Classification Search ............ 15/389–392; A47L 5/10
See application file for complete search history.

(56) References Cited

U.S. PATENT DOCUMENTS

| | | | |
|---|---|---|---|
| 2,730,220 A | 1/1956 | Dodd | 192/114 |
| 3,552,147 A * | 1/1971 | Johansson et al. | 464/35 |
| 3,724,815 A * | 4/1973 | Hawkins et al. | 74/29 |
| 3,924,421 A * | 12/1975 | Dehne et al. | 464/23 |
| 4,566,570 A * | 1/1986 | Geisthoff | 464/37 |
| 4,825,992 A | 5/1989 | Skrobisch | 192/56 L |
| 5,285,550 A * | 2/1994 | Meyer et al. | 15/328 |
| 5,308,281 A | 5/1994 | Nienhaus | 464/30 |
| 5,799,716 A | 9/1998 | Yamaguchi et al. | 160/310 |
| 5,974,622 A * | 11/1999 | Louis et al. | 15/340.2 |
| 6,131,238 A * | 10/2000 | Weber et al. | 15/340.3 |
| 6,158,084 A * | 12/2000 | Weber et al. | 15/390 |
| 6,174,238 B1 * | 1/2001 | Bondioli | 464/37 |
| 6,302,798 B1 | 10/2001 | Nakaguro et al. | 464/30 |
| 7,155,773 B2 * | 1/2007 | Haeussermann et al. | 15/390 |
| 7,389,700 B2 * | 6/2008 | Gao | 73/862.21 |
| 7,516,633 B1 * | 4/2009 | Chang | 70/472 |
| 7,540,719 B2 * | 6/2009 | Umemura | 417/223 |
| 2006/0068922 A1 | 3/2006 | Haeussermann et al. | 464/35 |
| 2008/0271285 A1* | 11/2008 | Maurer et al. | 15/389 |

FOREIGN PATENT DOCUMENTS

| | | |
|---|---|---|
| DE | 10304579 | 8/2004 |
| JP | 10443222 | 2/1989 |

\* cited by examiner

*Primary Examiner* — David A Redding
(74) *Attorney, Agent, or Firm* — Alan Kamrath; Kamrath & Associates PA

(57) ABSTRACT

An overload clutch (10) for a rotating agitation member (11) for a surface cleaning machine includes a clutch member (12) connected to the agitation member (11) to rotate therewith, a coupling member (20) rotatable relative to the clutch member (12), and a torque lever (40) having an end pivotally mounted to the coupling member (12). The other end of the torque lever (40) is biased to engage with the clutch member (12) such that the agitation member (11) is rotated together with the coupling member (20) when a torque load from the agitation member (11) is not greater than a preset level. The torque lever (40) pivots outward away from the clutch member (12) and disengages from the clutch member (12) to disconnect the torque lever (40) from the clutch member (12) when the torque load from the agitation member (11) is greater than the preset level.

19 Claims, 5 Drawing Sheets

OVERLOAD CLUTCH FOR ROTATING AGITATION MEMBER IN CLEANING MACHINE

BACKGROUND

The present invention relates to an overload clutch and, more particularly, to an overload clutch for a rotating agitation member in a cleaning machine such as a surface cleaning machine.

Many surface cleaning machines such as electric vacuum cleaners include a rotating agitation member to improve debris pick-up by a nozzle. The rotating agitation member is driven by a separate motor or the vacuum motor either directly or via a suitable drive such as a belt drive. The rotating agitation member may get stuck, and the motor driving the rotating agitation member will be damaged due to frictional heat if power transmission from the motor to the rotating agitation member is not cut off.

Overload disconnection devices provide solutions for cutting off power transmission from a driving part to a driven part when overload occurs. Some designs use magnetically controlled torque limiting clutches, and an example of which includes a motor driven hub carrying two concentric cup-shaped rings with a cylindrical permanent magnet therebetween. Keeper plates are pivotally secured to the hub and overlay coplanar edges of the rings to which the keeper plates are magnetically attracted. The hub has an extension on which freely rotates a power output disc provided with projecting fingers that engage with the keeper plates when they are in radial positions with respect to the hub. When an overload is applied to the output disc, the fingers turn the keeper plates until they are disengaged from the disc. Thus, the power output disc and hub are released to turn freely independent of each other, without generating frictional heat therebetween. However, resetting of the torque limiter clutch after it has disconnected the overload requires manually turning the keeper plates back to radially extending positions and starting the motor again to reestablish the normal drive-through conditions.

Another type of overload clutch design includes a drive element and a driven element which are arranged concentrically to one another, thereby forming an intermediate space for accommodating a plurality of steel balls. A star-shape collar and a torsion spring are utilized to retain the steel balls in their respective positions in the intermediate space during normal operation. The steel balls are moved into their respective recesses when an overload occurs. The steel balls must be received in a sealed space to prevent them from being lost. Furthermore, the structure and assembly of the overload clutch of this type are complicated and result in high cost for troublesome processing and assembling of the complicated structures of the star-shaped collar and other elements.

The present invention is intended to provide an overload clutch that has synergistic application to rotating agitation members of surface cleaning machines and that is simple in structure to allow manufacturing and easy assembly at low cost.

SUMMARY

The present invention solves this need and other problems in the field of surface cleaning by providing, in a preferred form, an overload clutch assembly for a surface cleaning machine having a rotating agitation member adapted to be rotated for cleaning a surface. The rotating agitation member is a brush in a preferred form. A clutch member connected to the rotating agitation member rotates therewith and has an outer periphery having a maximum radial extent from a rotation axis. A coupling member is rotatable relative to the clutch member about the rotation axis and adapted to be driven. A first torque lever includes a first end pivotally mounted to the coupling member about a pivot axis and a second end. The pivot axis is parallel to and radially spaced from the rotation axis greater than the maximum radial extent of the clutch member. The second end of the first torque lever is biased to press against and engage with a coupling portion of the clutch member such that the rotating agitation member is rotated together with the coupling member through the first torque lever and the clutch member when a torque load from the rotating agitation member is not greater than a preset level. The second end of the first torque lever pivots outward away from the clutch member about the pivot axis and disengages from the clutch member to disconnect the first torque lever from the clutch member when the torque load from the rotating agitation member is greater than the preset level. In the most preferred form, multiple circumferentially spaced torque levers are used.

In a preferred form, the coupling member includes a fixed shaft defining the pivot axis, and the first end of the first torque lever includes an opening in which the fixed shaft is pivotally received. Preferably, the overload clutch assembly includes a spring for biasing the second end of the first torque lever to press against and engage with the coupling portion of the clutch member, with the spring mounted around the fixed shaft in the most preferred form. The spring may be a torsion spring including a plurality of coils received around the pivot axis and first and second tangs. The first tang of the spring is fixed to a circumferential wall of the coupling member in the preferred form. The second tang of the spring is attached to the first torque lever for biasing the second end of the first torque lever to press against and engage with the coupling portion of the clutch member.

In the preferred form, the clutch member includes a plurality of coupling portions each having first and second abutment surfaces which are opposite to each other and which are linearly straight in the most preferred form. Each abutment surface extends at an acute angle to a radial line from the rotation axis through an associated pivot axis when the abutment surface is engaged with an associated torque lever. The first and second abutment surfaces of the coupling portions allow rotation of the rotating agitation member in either direction, depending on which of the abutment surfaces are engaged with the torque levers.

The present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

Figure 1:
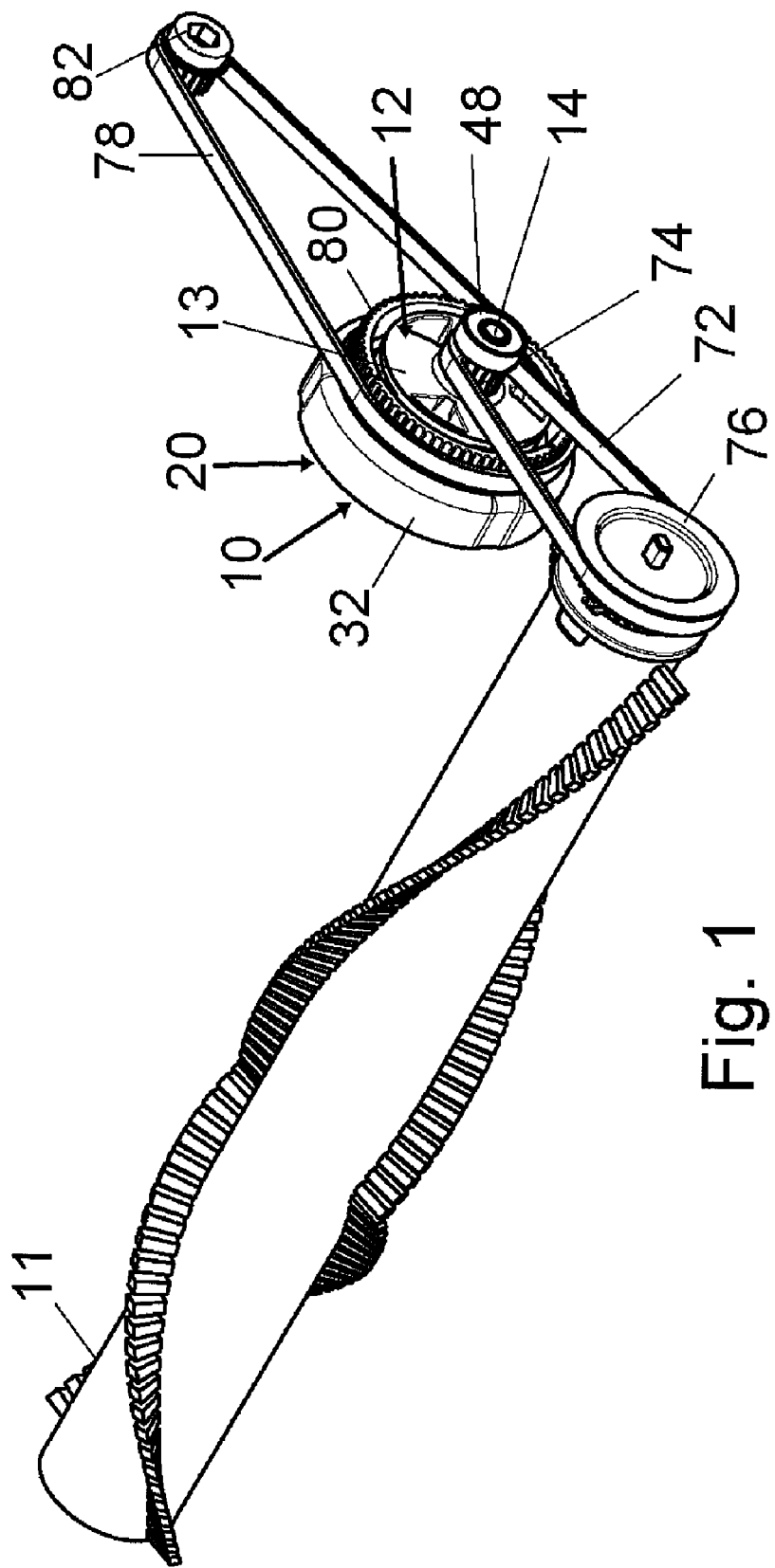
FIG. 1 is a perspective view illustrating an overload clutch assembly in accordance with the preferred teachings of the present invention.
Figure 2:
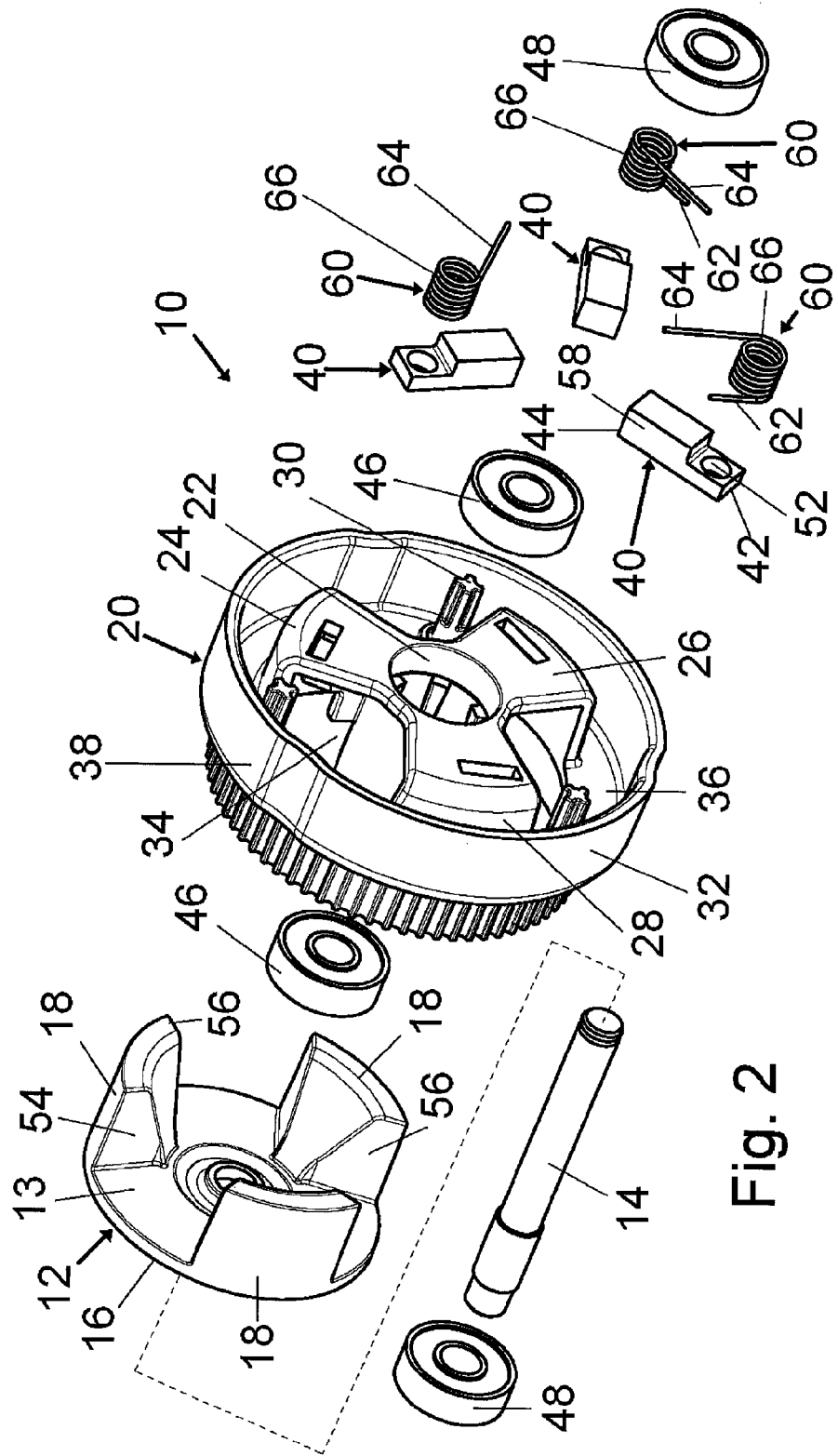
FIG. 2 is an exploded perspective view of the overload clutch of FIG. 1.
Figure 3:
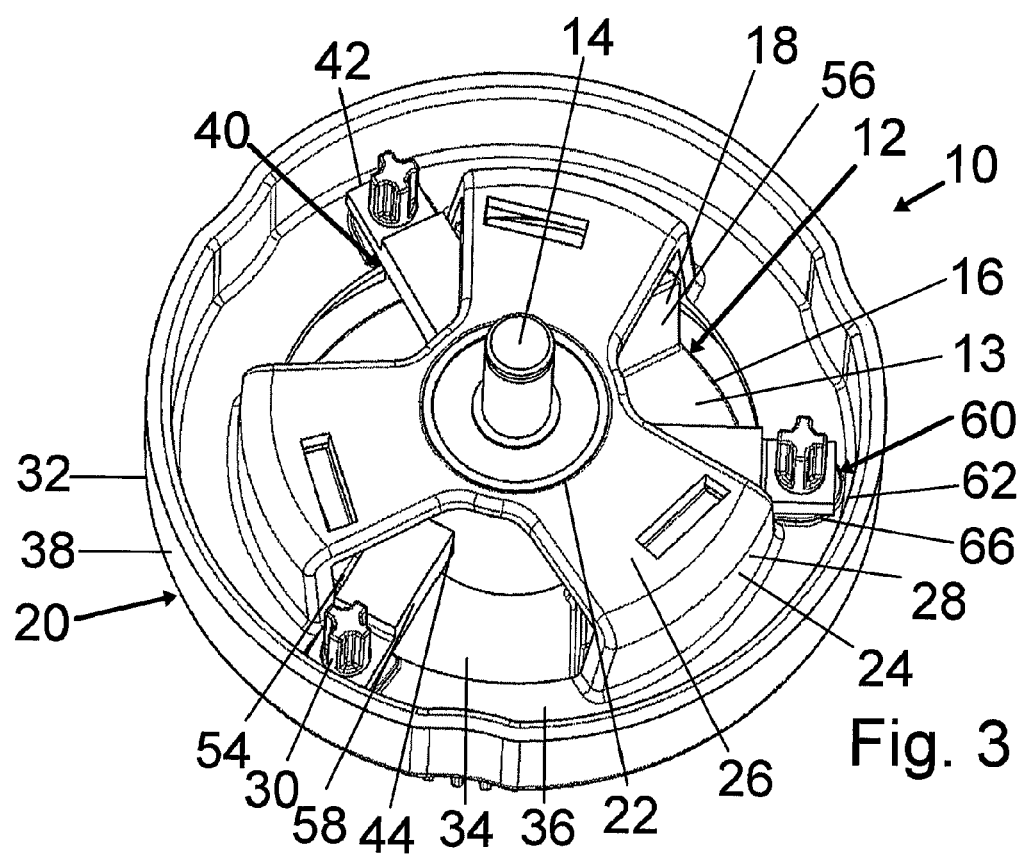
FIG. 3 is a perspective view illustrating the overload clutch of FIG. 1.
Figure 4:
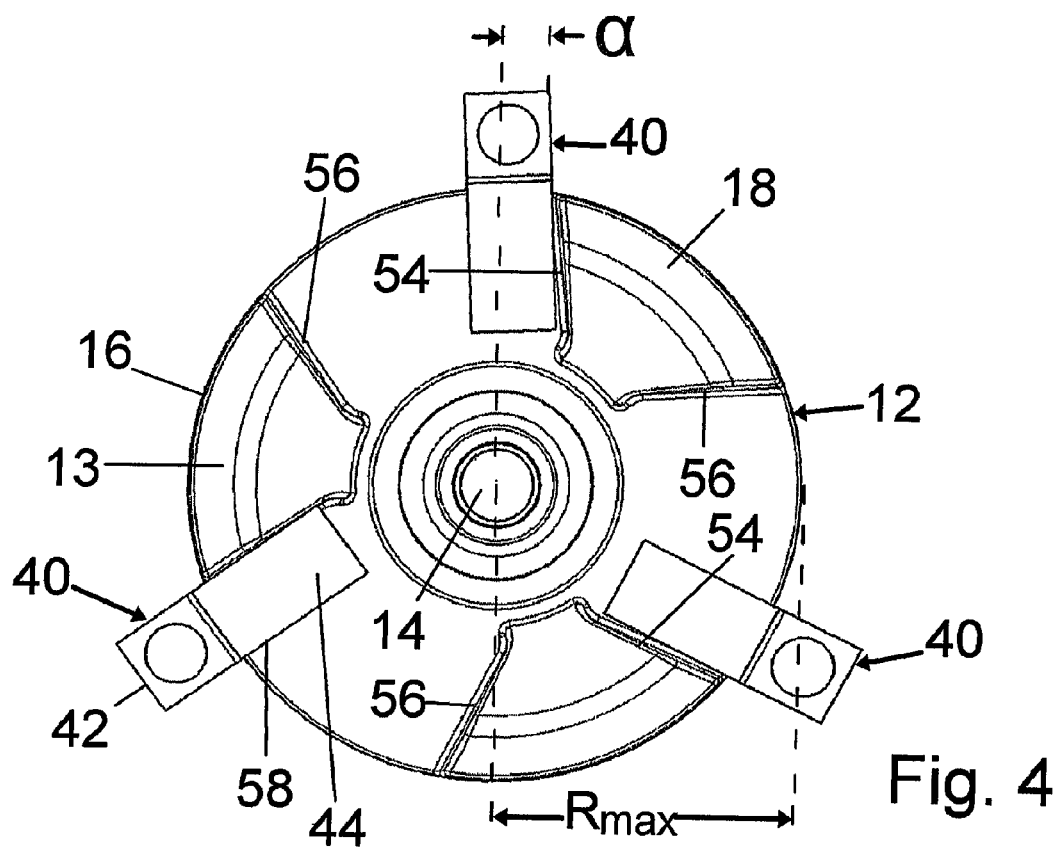
FIG. 4 is a diagrammatic elevational view of the clutch member and torque levers in FIG. 1.
Figure 5:
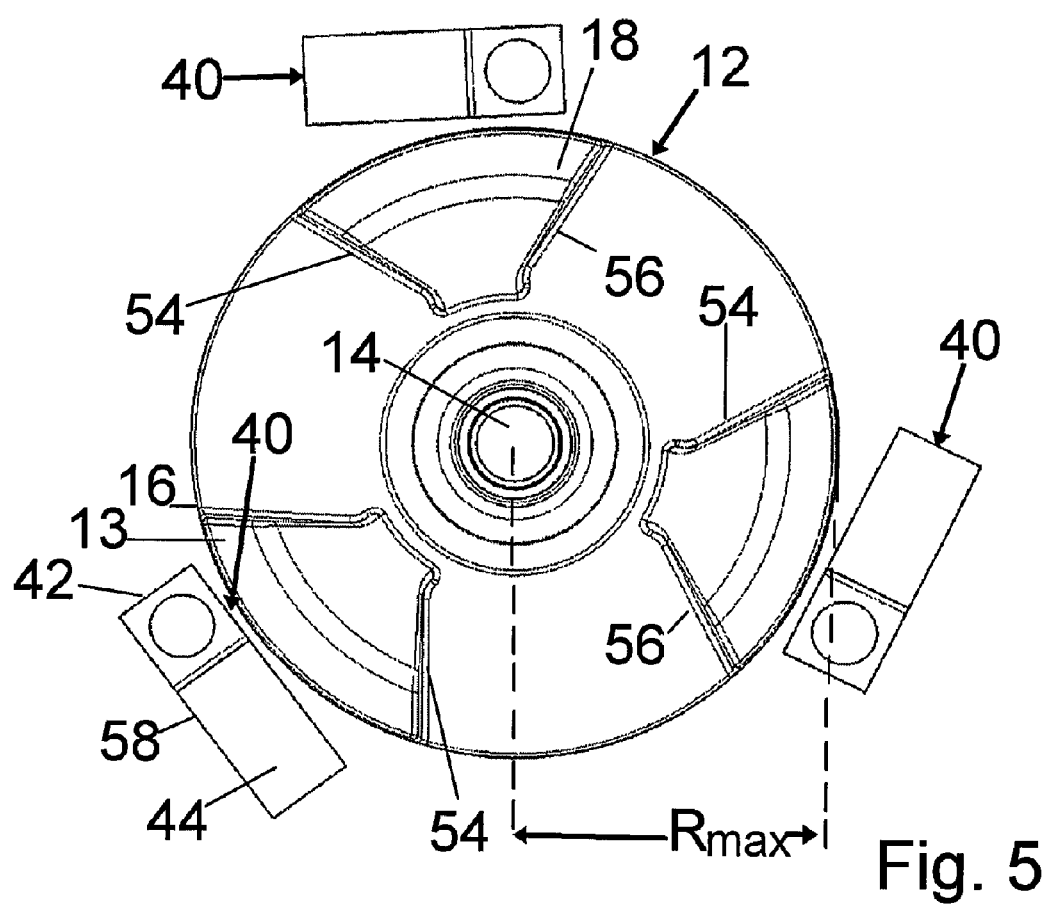
FIG. 5 is a view similar to FIG. 4, wherein the torque levers are held in outer positions under the action of centrifugal forces during overload.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "end", "portion", "longitudinal", "axial", "radial", "circumferential", "centrifugal", "lateral", "annular", "outward", "spacing", "clockwise", "counterclockwise", and similar terms are used herein, it should be understood that these terms have reference only to the structure shown in the drawings as it would appear to a person viewing the drawings and are utilized only to facilitate describing the invention.

DETAILED DESCRIPTION OF THE PREFERRED EMBODIMENT

An overload clutch for a rotating agitation member in a cleaning machine according to the preferred teachings of the present invention is shown in the drawings and generally designated 10. The cleaning machine is a surface cleaning machine such as an electric vacuum cleaner for cleaning a surface such as a floor. The cleaning machine may include a cleaning head with a nozzle in communication with a suction unit. The cleaning machine further includes a rotating agitation member 11 mounted in or next to the nozzle. In a preferred form, the rotating agitation member 11 is a brush 11 rotatable about a rotation axis. Other forms of the rotating agitation member would be within the skill of the art. When the cleaning machine is turned on for cleaning a surface, the rotating agitation member 11 is also turned for agitating the surface and improving debris pick-up of the nozzle.

The overload clutch 10 generally includes a coupling member 20, a clutch member 12, and a plurality of torque levers 40. In the preferred form, the coupling member 20 includes a hub 22, a circumferential wall 32, and a plurality of L-shaped members 24 extending between the hub 22 and the circumferential wall 32. Each L-shaped member 24 includes a first leg 26 extending radially from the hub 22 and a second leg 28 extending axially from the first leg 26 and connected to the circumferential wall 32. An opening 34 is defined between an adjacent pair of L-shaped members 24. The coupling member 20 further includes a plurality of fixed shafts 30 each defining a pivot axis. In the embodiment shown, the circumferential wall 32 includes a radial annular portion 36 to which the second leg 28 of each L-shaped member 24 is connected and a circumferential annular portion 38 extending axially along a circumference of the radial portion 36. The fixed shafts 30 are located on the radial portion 36 of the circumferential wall 32 and respectively face the openings 34.

According to the preferred form, the clutch member 12 is shown as a disk 13 with a plurality of circumferentially spaced coupling sections 18 protruding from a side of the disk 13 and extending axially. The disk 13 has a longitudinal hole (not labeled) through which a rotating shaft 14 extends, with the rotating shaft 14 defining a rotation axis of the overload clutch 10. The disk 13 has an outer periphery 16 having a maximum radial extent Rmax from the rotation axis. The clutch member 12 is securely mounted to the rotating shaft 14 such as by a key/groove coupling. In the most preferred form, the coupling member 20 is rotatably mounted to the shaft 14 such as by bearings 46 received on the shaft 14 and in the hub 22. The shaft 14 in turn is suitably rotatably mounted to the frame of the cleaning machine such as by bearings 48.

Each coupling portion 18 of the clutch member 12 includes a first abutment surface 54 that is linearly straight. The first abutment surface 54 extends at an acute angle $\alpha$ to a radial line extending from the rotation axis through an associated pivot axis when the first abutment surface 54 is used and engaged with an associated torque lever 40. Each coupling portion 18 of the clutch member 12 may further include a second abutment surface 56 opposite to the first abutment surface 54. The second abutment surface 56 of each coupling portion 18 of the clutch member 12 extends at an acute angle to a radial line extending from the rotation axis through an associated pivot axis when the second abutment surface 56 is used and engaged with an associated torque lever 40. Preferably, the first and second abutment surfaces 54 and 56 extend toward each other with reducing radial spacing from the rotation axis. In the embodiment shown, each coupling portion 18 has a wedge or generally trapezoidal shape with two linear lateral edges forming the first and second abutment surfaces 54 and 56. The inner ends of the lateral edges are interconnected by an inner edge of an arcuate shape and are radially spaced from the rotation axis. The outer ends of the lateral edges are interconnected by an outer edge of an arcuate shape and radially spaced outwardly from the inner edge. Preferably, the acute angles of the first and second abutment surfaces 54 and 56 are equal and in the order of 4°.

Each torque lever 40 includes a first end 42 and a second end 44. The first end 42 of each torque lever 40 is pivotally mounted to an associated fixed shaft 30 of the coupling member 20. Specifically, in the preferred form shown, the first end 42 of each torque lever 40 has an opening 52 through which an associated fixed shaft 30 extends. Thus, each fixed shaft 30 and an associated opening 52 define a pivot axis for an associated torque lever 40. Each torque lever 40 further includes first and second, parallel engagement surfaces 58 tangent to and radially spaced from the associated pivot axis. In the most preferred form, the first and second engagement surfaces 58 are linearly straight.

In the preferred form shown, a spring 60 is mounted on each fixed shaft 30 for biasing the second end 44 of an associated torque lever 40 to press against and engage with the clutch member 12. In the embodiment shown, the spring 60 is a torsion spring including a plurality of coils 66 received around an associated fixed shaft 30 of the coupling member 20, a first tang 62 fixed to the circumferential wall 32 of the coupling member 30, and a second tang 64 attached to an associated torque lever 40 for biasing the second end 44 of the associated torque lever 40 to press against and engage with an associated coupling portion 18 of the clutch member 12.

In the preferred form, the clutch member 12 is suitably connected to the rotating agitation member 11 to rotate therewith such as by a belt 72 extending around a pulley 74 integrally formed on disk 13 opposite coupling portions 18 and a pulley 76 connected to the rotating agitation member 11 as shown in the preferred form. Likewise, coupling member 20 can be suitably driven to rotate about shaft 14 such as by a belt 78 extending around a pulley 80 integrally formed on radial portion 36 opposite to shafts 30 and a pulley 82 which in turn can be driven by a separate motor or the vacuum motor either directly or via a suitable drive such as a belt drive.

Now that the basic construction of the overload clutch 10 of the preferred teachings of the present invention has been explained, the operation and some of the advantages of the overload clutch 10 can be set forth and appreciated. The coupling member 20 is driven by a motor directly or via a belt drive or other suitable transmission device. When a torque load from the rotating agitation member 11 is not greater than a preset level, the second end 44 of each torque lever 40 is biased to press against and engage with an associated coupling portion 18 of the clutch member 12. Specifically, one of the engagement surfaces 58 of each torque lever 40 presses against and engages with the first abutment surface 54 of an associated coupling portion 18 under the action of the associated spring 60. Thus, the rotating shaft 14 is rotated together with the coupling member 20 through the torque levers 40 and the clutch member 12. As a result, the rotating agitation member 11 rotatably connected to the rotating shaft 14 is turned for cleaning a surface and/or improving debris pick-up by a nozzle. During rotation of the coupling member 20, centrifugal forces resulting from rotation of the coupling member 20 act through the pivot axes of the torque levers 40, and the torque levers 40 will not pivot about their respective pivot axes.

When a torque load from the rotating agitation member 11 is greater than the preset level such as in the event that the rotating agitation member 11 is held from rotating, the rotating shaft 14 and the clutch member 12 are blocked due to overload whereas the torque levers 40 fixed on the coupling member 20 respectively pivot away from the clutch member 12 about the pivot axes while the coupling member 20 turns. Thus, the torque levers 40 are disengaged from the clutch member 12 during overload. As a result, power transmission from the coupling member 20 to the clutch member 12 is cut off when overload occurs. Damage to the motor is, thus, avoided.

After an overload has occurred and if the centrifugal forces resulting from rotation of the coupling member 20 are greater than the biasing forces of the springs 60, the centrifugal forces hold the torque levers 40 in outer positions until the motor is almost stopped. When the centrifugal forces are insufficient, the springs 60 bias the torque levers 40 such that the engagement surfaces 58 of the torque levers 40 press against and engage with the first abutment surfaces 54 of the clutch member 12.

The overload clutch 10 may further include a sensor for detecting the torque load and sending a signal to turn off the motor when the torque load is greater than the preset level. A user of the surface cleaning machine may solve the problem of the rotating agitation member 11 while the motor is off, avoiding potential risk of injury to the user.

The clutch member 12 according to the preferred form shown allows rotation in opposite directions about the rotation axis. Specifically, the first abutment surfaces 54 of the clutch member 12 are used when the clutch member 12 rotates in a clockwise direction. On the other hand, the second abutment surfaces 56 of the clutch member 12 are used when the clutch member 12 rotates in a counterclockwise direction. It should be appreciated that the springs 60 can be assembled so that their bias will urge one of the engagement surfaces 58 of each torque lever 40 to press against the first abutment surfaces 54 or the second abutment surfaces 56 of the clutch member 12 depending on the desired rotating direction. Thus, construction of the overload clutch 10 according to the preferred embodiment of the present invention allows use of identical parts for rotation in either direction.

It is noted that the overload clutch in accordance with the present invention is simple in structure and, thus, can be manufactured and assembled at low cost.

Now that the basic teachings of the present invention have been explained, many extensions and variations will be obvious to one having ordinary skill in the art. For example, although three torque levers 40 are shown in the preferred embodiment of the present invention, fewer or a greater number of torque levers 40 can be utilized according to the teachings of the present invention. As an example, the overload clutch 10 may use only one torque lever 40 if the biasing force provided by the spring 60 is sufficient to provide the required coupling between the clutch member 12 and the coupling member 20.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. An overload clutch assembly for a surface cleaning machine, comprising, in combination:

a rotating agitation member adapted to be rotated for cleaning a surface;

a clutch member connected to the rotating agitation member to rotate therewith and including an outer periphery having a maximum radial extent from a rotation axis, with the clutch member further including a coupling portion;

a coupling member rotatable relative to the clutch member about the rotation axis and adapted to be driven; and a first torque lever including a first end pivotally mounted to the coupling member about a pivot axis and including a second end, with the pivot axis being parallel to and radially spaced from the rotation axis greater than the maximum radial extent of the clutch member;

with the second end of the first torque lever being biased to press against and engage with the coupling portion of the clutch member such that the rotating agitation member is rotated together with the coupling member through the first torque lever and the clutch member when a torque load from the rotating agitation member is not greater than a preset level; and with the second end of the first torque lever pivoting outward away from the clutch member about the pivot axis and disengaging from the clutch member to disconnect the first torque lever from the clutch member when the torque load from the rotating agitation member is greater than the preset level.

2. The overload clutch assembly for a surface cleaning machine as claimed in claim 1, further comprising, in combination: a spring for biasing the second end of the first torque lever to press against and engage with the coupling portion of the clutch member.

3. The overload clutch assembly for a surface cleaning machine as claimed in claim 2, with the spring being a torsion spring including a plurality of coils received around the pivot axis and first and second tangs, with the first tang of the spring being fixed to the coupling member and with the second tang of the spring being attached to the first torque lever for biasing the second end of the first torque lever to press against and engage with the coupling portion of the clutch member.

4. The overload clutch assembly for a surface cleaning machine as claimed in claim 1, with the coupling member including a fixed shaft defining the pivot axis, and with the first end of the first torque lever including an opening in which the fixed shaft is pivotally received.

5. The overload clutch assembly for a surface cleaning machine as claimed in claim 4, further comprising, in combination: a spring mounted around the fixed shaft, with the coupling member further including a circumferential wall, and with the spring including a first end fixed to the circumferential wall of the coupling member and a second end attached to the first torque lever for biasing the second end of the first torque lever to press against and engage with the coupling portion of the clutch member.

6. The overload clutch assembly for a surface cleaning machine as claimed in claim 5, with the coupling member further including a hub and a pair of L-shaped members each having a first leg and second leg, with the first leg of the L-shaped member extending radially from the hub, with the second leg of the L-shaped member extending axially from the first leg and being connected to the circumferential wall of the coupling member, with the rotation axis extending through the hub, and with an opening being defined between the pair of L-shaped members to allow the second end of the first torque lever to extend toward and engage with the clutch member.

7. The overload clutch assembly for a surface cleaning machine as claimed in claim 1, further comprising, in combination: a plurality of second torque levers, with the first torque lever and the second torque levers being circumferentially spaced from one another, with each of the second torque levers including a first end pivotally mounted to the coupling member about a pivot axis parallel to and radially spaced from the rotation axis greater than the maximum radial extent of the clutch member, with each of the second torque levers including a second end;
with the second end of each of the second torque levers being biased to press against and engage with another coupling portion of the clutch member when the torque load from the rotating agitation member is not greater than the preset level; and
with the second ends of the second torque levers pivoting outward away from the clutch member about the pivot axes and disengaging from the clutch member to disconnect the second torque levers from the clutch member when the torque load from the rotating agitation member is greater than the preset level.

8. The overload clutch assembly for a surface cleaning machine as claimed in claim 7, further comprising, in combination: a plurality of springs each for biasing the second end of an associated one of the second torque levers to press against and engage with the other coupling portion of the clutch member.

9. The overload clutch assembly for a surface cleaning machine as claimed in claim 8, with each of the springs being a torsion spring including a plurality of coils received around the pivot axis of an associated one of the second torque levers and first and second tangs, with the first tang of each of the springs fixed to the coupling member and with the second tang of each of the springs attached to the associated one of the second torque levers for biasing the second end of the associated second torque lever to press against and engage with the other coupling portion of the clutch member.

10. The overload clutch assembly for a surface cleaning machine as claimed in claim 7, with the coupling member including a plurality of fixed shafts defining the pivot axes, and with the first end of each of the second torque levers including an opening in which an associated one of the fixed shafts is pivotally received.

11. The overload clutch assembly for a surface cleaning machine as claimed in claim 10, further comprising, in combination: a plurality of springs respectively mounted around the fixed shafts, with the coupling member further including a circumferential wall, and with each of the springs including a first end fixed to the circumferential wall of the coupling member and a second end attached to an associated one of the second torque levers for biasing the second end of the associated second torque lever to press against and engage with the other coupling portion of the clutch member.

12. The overload clutch assembly for a surface cleaning machine as claimed in claim 11, with the coupling member further including a hub and a plurality of L-shaped members each having a first leg and second leg, with the first leg of each of the L-shaped members extending radially from the hub, with the second leg of each of the L-shaped members extending axially from the first leg and being connected to the circumferential wall of the coupling member, with the rotation axis extending through the hub, and with an opening being defined between an adjacent pair of L-shaped members to allow the second end of an associated one of the second torque levers to extend toward and engage with the clutch member.

13. The overload clutch assembly for a surface cleaning machine as claimed in claim 1, with the coupling portion of the clutch member further including a first abutment surface extending at an acute angle to a radial line extending from the rotation axis through the pivot axis when the first abutment surface is engaged with the first torque lever, and with the first torque lever pressing against the first abutment surface when the torque load from the rotating agitation member is not greater than the preset level.

14. The overload clutch assembly for a surface cleaning machine as claimed in claim 13, with the first torque lever further including an engagement surface tangent to and radially spaced from the pivot axis and linearly straight, with the first abutment surface being linearly straight.

15. The overload clutch assembly for a surface cleaning machine as claimed in claim 14, with the coupling portion of the clutch member further including a second abutment surface, with one of the first and second abutment surfaces being selectively engaged with the engagement surface of the first torque lever, with the second abutment surface extending at an acute angle to the radial line from the rotation axis through the pivot axis when the second abutment surface is engaged with the engagement surface of the first torque lever, with the first and second abutment surfaces extending toward each other with reducing spacing from the rotation axis to allow the clutch member to be rotated in opposite directions about the rotation axis.

16. The overload clutch assembly for a surface cleaning machine as claimed in claim 15, with the acute angles of the first and second abutment surfaces being equal and in the order of 4°.

17. The overload clutch assembly for a surface cleaning machine as claimed in claim 14, further comprising, in combination: a spring for biasing the second end of the first torque lever to press against and engage with the coupling portion of the clutch member.

18. The overload clutch assembly for a surface cleaning machine as claimed in claim 17, with the spring being a torsion spring including a plurality of coils received around the pivot axis and first and second tangs, with the first tang of the spring being fixed to the coupling member and with the second tang of the spring being attached to the first torque lever for biasing the second end of the first torque lever to press against and engage with the coupling portion of the clutch member.

19. The overload clutch assembly for a surface cleaning machine as claimed in claim 13, with the acute angle of the first abutment surface being in the order of 4°.

* * * * *